(12) United States Patent
Ferguson et al.

(10) Patent No.: US 8,985,549 B2
(45) Date of Patent: Mar. 24, 2015

(54) ELECTROMAGNETIC VALVE

(75) Inventors: Tim Ferguson, Brownstown, MI (US); William D. Doyle, Chelsea, MI (US); David E. Collins, Plymouth, MI (US)

(73) Assignee: Kelsey-Hayes Company, Livonia, MI (US)

(*) Notice: Subject to any disclaimer, the term of this patent is extended or adjusted under 35 U.S.C. 154(b) by 240 days.

(21) Appl. No.: 13/574,429

(22) PCT Filed: Feb. 3, 2011

(86) PCT No.: PCT/US2011/023621
§ 371 (c)(1),
(2), (4) Date: Aug. 28, 2012

(87) PCT Pub. No.: WO2011/097392
PCT Pub. Date: Aug. 11, 2011

(65) Prior Publication Data
US 2012/0326065 A1 Dec. 27, 2012

Related U.S. Application Data

(60) Provisional application No. 61/301,170, filed on Feb. 3, 2010.

(51) Int. Cl.
*F16K 31/12* (2006.01)
*F16K 27/02* (2006.01)
(Continued)

(52) U.S. Cl.
CPC .............. *F16K 27/0245* (2013.01); *B60T 8/363* (2013.01); *B60T 8/4872* (2013.01); *F16K 31/0665* (2013.01); *F16K 27/029* (2013.01)
USPC ....................................... 251/30.03

(58) Field of Classification Search
USPC .......................... 251/30.01–30.03; 303/119.2
See application file for complete search history.

(56) References Cited

U.S. PATENT DOCUMENTS 2,911,183 A * 11/1959 Matthews et al. ........ 251/129.02
5,669,675 A    9/1997 Mueller et al.
(Continued)

FOREIGN PATENT DOCUMENTS

DE    19922334 A1    9/2000
DE    19951665 A1    5/2001
(Continued)

*Primary Examiner* — John K Fristoe, Jr.
*Assistant Examiner* — Kevin E Lynn
(74) *Attorney, Agent, or Firm* — MacMillan, Sobanski & Todd, LLC (57) ABSTRACT

An electromagnetic valve (32) for use in controlling fluid flow between first and second passageways (P1, P2) in a hydraulic valve block (4), includes a valve body (51). The valve body (51) defines a central axis (A), has a central opening (51A) therethrough, has a lower end (54) adapted to be inserted into a bore (19) of the valve block (4), and is provided with a lower cylindrical opening (70). An armature (56) is axially movable within the valve body (51) and is biased by a spring in one axial direction (57A). A closing element (88) is carried by a lower end (54) of the armature (56). An electromagnetic coil (64) coaxially surrounds the armature (56) and is operable to effect axial movement of the armature (56) in an axial direction opposite the one direction (57B). A valve seat member (62) is carried by the lower end (54) of the valve body (51) and has an orifice (98) providing fluid flow between the first and second valve block passageways (P1, P2). The valve seat member (62) defines a valve seat (96) surrounding the orifice (98) and cooperates with the closing element (88) for selectively closing the orifice (98). The valve seat member (62) includes a cylindrical tubular portion (90) frictionally retained in the lower cylindrical opening (70) of the valve body (51). The lower cylindrical opening (70) of the valve body (51) is provided with a stop surface (68) at the upper end of thereof, and an upper part (92) of the cylindrical portion (90) of the valve seat member (62) includes a flange (100) engageable with the stop surface (68) for limiting downward movement of the valve seat member (62) relative to the valve body (51).

14 Claims, 4 Drawing Sheets

(51) Int. Cl.
  *B60T 8/36* (2006.01)
  *B60T 8/48* (2006.01)
  *F16K 31/06* (2006.01)

(56) References Cited

U.S. PATENT DOCUMENTS

| | | | |
|---|---|---|---|
| 5,788,344 A * | 8/1998 | Friedow et al. | 303/119.2 |
| 5,810,330 A * | 9/1998 | Eith et al. | 251/129.19 |
| 5,971,501 A | 10/1999 | Hosoya | |
| 6,003,838 A | 12/1999 | Beck | |
| 6,021,997 A * | 2/2000 | Hell | 251/30.04 |
| 6,189,985 B1 | 2/2001 | Fritsch et al. | |
| 6,247,766 B1 | 6/2001 | Subramanian et al. | |
| 6,254,199 B1 | 7/2001 | Megerle et al. | |
| 6,637,724 B1 | 10/2003 | Mayer | |
| 6,644,623 B1 | 11/2003 | Voss et al. | |
| 6,789,779 B2 * | 9/2004 | Wilde et al. | 251/129.15 |
| 7,341,236 B2 * | 3/2008 | Stephenson et al. | 251/30.04 |
| 2005/0173979 A1 | 8/2005 | Voss | |
| 2009/0095929 A1 | 4/2009 | Lee | |

FOREIGN PATENT DOCUMENTS

| | | |
|---|---|---|
| DE | 10002269 A1 | 7/2001 |
| DE | 10203325 A1 | 3/2003 |
| DE | 19635690 B4 | 7/2006 |
| DE | 19951665 B4 | 1/2010 |
| JP | 2002347597 A | 12/2002 |
| KR | 10-1999-0086832 A | 12/1999 |
| WO | 0130626 A1 | 5/2001 |

* cited by examiner

ELECTROMAGNETIC VALVE

BACKGROUND

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Various embodiments of a control valve are described herein. In particular, the embodiments described herein are mounted in a hydraulic control unit of an electronically controlled brake system.

Electronically controlled brake systems for vehicles are well known. One type of electronically controlled brake system includes a hydraulic control unit (HCU) connected in fluid communication between a master cylinder and a plurality of wheel brakes. The HCU typically includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby respectively permitting or blocking fluid flow through the valve. A coil assembly is provided about the sleeve. When the valve is energized, an electromagnetic field or flux generated by the coil assembly causes the armature to respectively slide from the biased open or closed position to a closed or open position.

Control valves mounted in a HCU are actuated by an electronic control unit (ECU) to provide desired braking functions such as anti-lock braking, traction control, and vehicle stability control.

To provide desired braking responses, an armature must respond quickly and in a predictable manner to an electromagnetic field generated by an energized coil assembly.

SUMMARY

The present application describes various embodiments of an electromagnetic valve for use in controlling fluid flow between first and second passageways in a hydraulic valve block. One embodiment of the electromagnetic valve includes a valve body. The valve body defines a central axis, has a central opening therethrough, has a lower end adapted to be inserted into a bore of the valve block, and is provided with a lower cylindrical opening. An armature is axially moveable within the valve body and is spring biased in one axial direction. A closing element is carried by a lower end of the armature. An electromagnetic coil coaxially surrounds the armature and is operable to effect axial movement of the armature in an axial direction opposite the one direction. A valve seat member is carried by the lower end of the valve body and has an orifice providing fluid flow between the first and second valve block passageways. The valve seat member defines a valve seat surrounding the orifice and cooperates with the closing element for selectively closing the orifice. The valve seat member includes a cylindrical tubular portion frictionally retained in the lower cylindrical opening of the valve body. The lower cylindrical opening of the valve body is provided with a stop surface at the upper end of thereof, and an upper part of the cylindrical portion of the valve seat member includes a flange engageable with the stop surface for limiting downward movement of the valve seat member relative to the valve body.

Other advantages of the electromagnetic valve will become apparent to those skilled in the art from the following detailed description, when read in light of the accompanying drawings.

DETAILED DESCRIPTION

Figure 1:
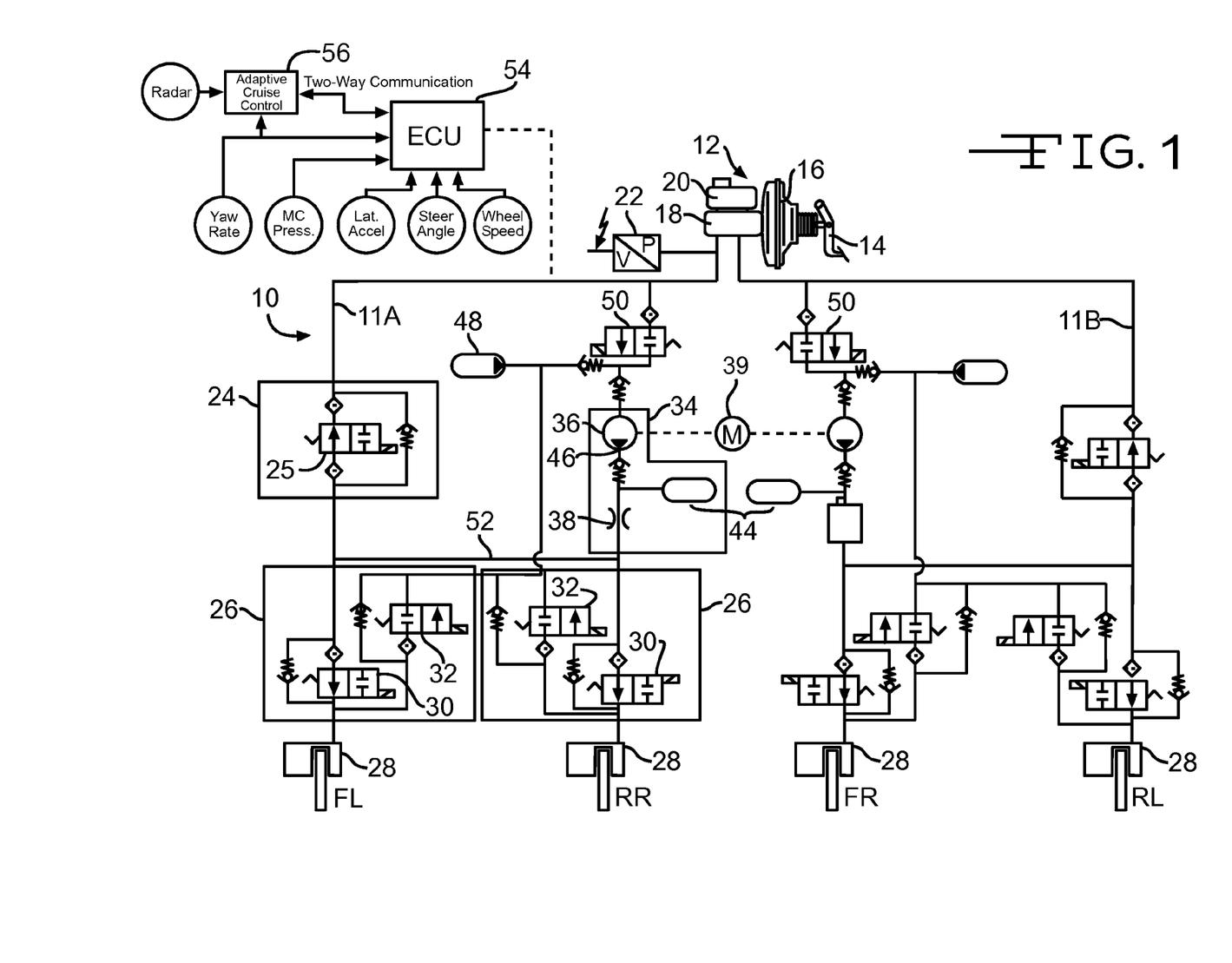
FIG. 1 is a schematic diagram of a vehicle brake system having a normally closed dump valve.

A hydraulic vehicle brake system is indicated generally at 10 in FIG. 1. The illustrated embodiment of the vehicle brake system 10 includes valves and other components described below to provide an electronic brake control capability. The vehicle brake system 10 is intended to be exemplary and it will be appreciated that there are other brake control system configurations that may be used to implement the various valve embodiments described herein. In other embodiments, the brake system 10 may include components to provide an anti-lock braking, traction control, and/or vehicle stability control function.

The vehicle brake system 10 has two separate brake circuits 11A and 11B, respectively, which are depicted on the left and right halves of FIG. 1. In the exemplary embodiment illustrated in FIG. 1, the circuits supply brake pressure to a front and rear wheel brake. The illustrated rear wheel brake is arranged diagonally to the front wheel brake. Only a left brake circuit 11A in FIG. 1 is described in the following in more detail, however a right brake circuit 11B in FIG. 1 is structured in the same manner.

The brake system 10 includes a driver-controlled first pressure generating unit 12 with a brake pedal 14, a power brake unit 16 and a tandem master brake cylinder 18, which presses the brake fluid out of a reservoir 20 into the two brake circuits 11A and 11B. Arranged behind an outlet of the tandem master brake cylinder 18 is a pressure sensor 22 for detecting the driver's input.

Under normal driving conditions, a brake fluid pressure emanating from the driver-controlled first pressure generating unit 12 continues via the block valve arrangement 24 and an anti-lock brake system (ABS) valve arrangement 26 to wheel brake cylinders 28. The ABS valve arrangement 26 includes an ABS inlet or isolation valve 30 and an ABS discharge or dump valve 32. The ABS inlet valve 30 is normally open, and the ABS discharge valve 32 is normally closed. Each wheel brake cylinder 28 includes an ABS valve arrangement 26 and the brake fluid pressure of both brake circuits is distributed diagonally in the vehicle to a respective pair of wheel brake cylinders 28 (front left (FL) and rear right (RR), or front right (FR) and rear left (RL)), respectively. The illustrated block valve arrangement 24 is part of a traction control or vehicle stability control system and includes an isolation valve 25 that is normally open in a currentless state. In a current-carrying state the block valve arrangement 24 is blocked from a backflow of brake fluid from the wheel brake cylinders 28 to the master brake cylinder 18.

Brake fluid pressure may be built up independent of the driver-controlled first pressure generating unit 12 by an autonomous second pressure generating unit 34. The autonomous second pressure generating unit 34 includes a pump 36 driven by a pump motor 39, an attenuator 44, and an orifice 38. The attenuator 44 is in fluid communication with a pump outlet 46 and the inlet side 40 of the orifice 38. Pulsations emanating from the pump 36 are periodic fluctuations in the brake fluid flow. The attenuator 44 takes in brake fluid during the pulsation peaks and releases it again between the pulsation peaks. As a result, the attenuator 44 levels out a temporal pressure progression on the inlet side 40 of the orifice 38.

Arranged on the intake side of the pump 36 are a low pressure accumulator (LPA) 48 and a pump inlet or supply valve 50. The illustrated pump inlet valve 50 is a normally closed valve. When the pump inlet valve 50 is currentless and closed, the pump 36 is supplied with brake fluid from the LPA 48. When the pump inlet valve 50 is current-carrying and open, the pump 36 can also suction brake fluid from the master brake cylinder 18.

The driver-controlled first pressure generating unit 12 and the autonomous second pressure generating unit 34 convey brake fluid in a common brake branch 52 of one of the two brake circuits. As a result, both pressure generating units 12, 34 can build up brake fluid pressure to the wheel brake cylinders 28 of the brake circuit independent of one another.

The vehicle brake system 10 described in the foregoing uses the autonomous second pressure generating unit 34 for generating brake pressure within the scope of a vehicle stability control (VSC function). Moreover, the autonomous second pressure generating unit 34 is also used for the adaptive cruise control (ACC function). In the process, the autonomous second pressure generating unit 34 can build up brake fluid pressure for autonomously braking the vehicle in the course of a stop-and-go function in frequent succession and not just in extraordinary, relatively rare driving situations. This also occurs with predominantly low to moderate driving speeds, at which the basic noise level in the vehicle interior is relatively low. Under such conditions, known pressure generating units represent a source of noise and pulsation that is annoying in terms of driving comfort.

Figure 2:
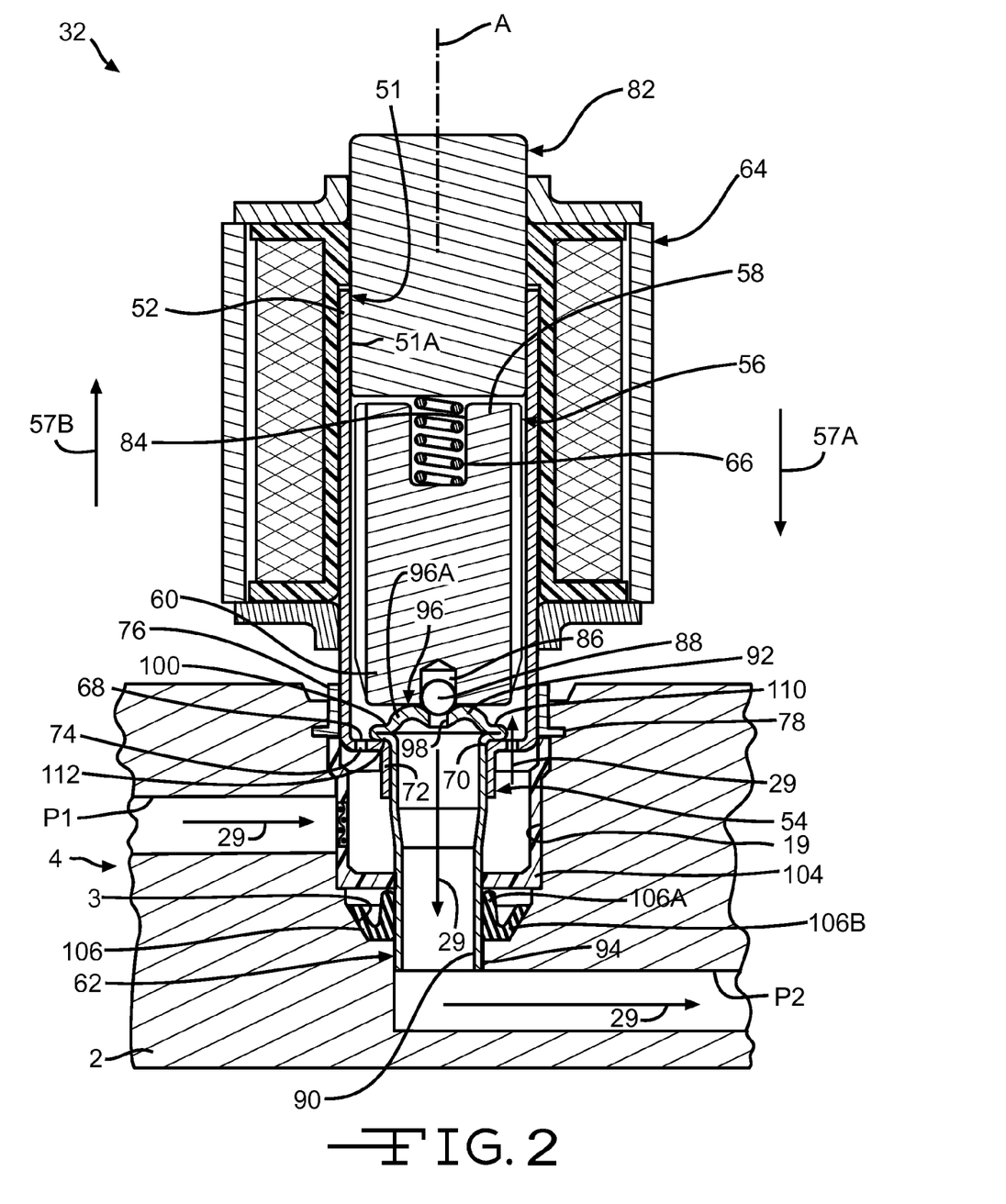
FIG. 2 is a cross-sectional view of the dump valve illustrated in FIG. 1.

It will be understood that the vehicle brake system 10 may include a hydraulic valve block or hydraulic control unit (HCU) 4 (not shown in FIG. 1) connected in fluid communication between the master brake cylinder 18 and wheel brake cylinders 28. As best shown in FIG. 2, the HCU 4 typically includes a housing 2 containing the various control valves and other components described herein for selectively controlling hydraulic brake pressure at the wheel brake cylinders 28.

As shown at 54 in FIG. 1, the vehicle brake system 10 may include an electronic control unit (ECU) which receives input signals from sensors, such as yaw rate, master cylinder pressure, lateral acceleration, steer angle, and wheel speed sensors. The ECU may also receive ground speed data from the ACC system 56. The ACC system may receive input data from a radar and the vehicle yaw rate sensor. One example of a vehicular control system adapted to control fluid pressure in an electronically-controlled vehicular braking system and an electronically-controlled ACC system is disclosed in U.S. Pat. No. 6,304,808 to Milot, which is incorporated herein by reference.

A sectional view of an exemplary embodiment of the dump valve 32 is shown in FIG. 2. The dump valve 32 is received in a bore 19 formed in the housing 2. The dump valve 32 includes a valve body or sleeve 51 having a first end 52 (the upper end when viewing FIG. 2) and a second end 54 (the lower end when viewing FIG. 2). The sleeve 51 defines a central or longitudinal axis A. An armature 56 has a first end 58 and a second end 60 and is slidably received in the sleeve 51.

The dump valve 32 further includes a valve seat member 62 and a coil assembly 64 disposed about the sleeve 51. Because the dump valve 32 is a normally closed valve, the armature 56 is biased into contact with the valve seat member 62 by a spring 66 when the coil assembly 64 of the dump valve 32 is not energized, thereby blocking fluid flow through the dump valve 32. When the coil assembly 64 is energized, the armature 56 is urged away from the valve seat member 62 to permit fluid flow between a first passageway P1 and a second passageway P2 and through the dump valve 32, as indicated by the arrows 29.

In the illustrated embodiment, the sleeve 51 has a central opening 51A therethrough and is formed as a single piece from non-ferromagnetic material in a deep drawing process. An example of suitable ferromagnetic material is stainless steel. It will be understood however, that low-carbon steel is not required, and that the sleeve 51 may be formed from any other desired non-ferromagnetic material.

The first end 52 of the sleeve 51 defines an axially extending cylindrical portion. The second end 54 of the sleeve 51 includes a radially inwardly extending wall which defines a stop surface or shoulder 68. The shoulder 68 further defines a lower cylindrical or sleeve opening 70. The opening 70 includes an axially extending cylindrical portion 72. The shoulder 68 has at least one fluid flow aperture 74 formed therein.

A substantially cylindrical mounting collar 76 is attached, such as by welding, about an outer surface of the second end 54 of the sleeve 51. The illustrated collar 76 includes a radially outwardly extending circumferential flange 78 at one end (the lower end when viewing FIG. 2). A magnetic core 82 is attached within the first end 52 of the sleeve 51, thereby closing the first end 52 of the sleeve 51. The core 82 may be attached to the first end 52 of the sleeve 51 by any suitable means, such as with a single laser weld. Alternatively, the core 82 may be attached to the first end 52 of the sleeve 51 by any other desired method.

The armature 56 is slidably received in the first end 52 of the sleeve 51. In the exemplary embodiment illustrated, the first end 58 of the armature 56 includes a spring cavity 84. The spring 66 is disposed in the cavity 84 and engages the armature 56 and the core 82 to urge the armature 56 toward the valve seat member 62 (in the direction of the arrow 57A) when the dump valve 32 is in the closed position. When the coil assembly 64 is energized, the armature 56 moves away from the valve seat member 62 (in the direction of the arrow 57B) such that the armature 56 is disposed at an extreme of travel away from the valve seat member 62, and is in an open position (not illustrated).

A substantially cylindrical recess 86 is formed in an end surface of the second end 60. A spherical closing element or ball 88 is pressed into the recess 86. In the illustrated embodiment, the ball 88 is formed from steel. Alternatively, the ball 88 may be formed from any other substantially non-deformable metal or non-metal. The ball 88 acts as a valve sealing element and engages the valve seat member 62 when the valve 32 is in the closed position (e.g. when the coil assembly 64 is not energized, as shown in FIG. 2). It will be understood that the ball 88 is not required, and that a valve sealing element may be integrally formed in the armature 56 at the second end 60 of the armature 56.

In the illustrated embodiment, the armature 56 is formed from ferromagnetic material in a cold forming process. An example of suitable ferromagnetic material is low-carbon steel. It will be understood however, that low-carbon steel is not required, and that the armature 56 may be formed from any other desired ferromagnetic material.

The valve seat member 62 includes a generally cylindrical tubular portion or body 90, an upper part or first end 92, and a lower part or second end 94. The first end 92 defines a valve seat 96 surrounding an orifice or opening 98. A radially outwardly extending circumferential flange 100 is formed at the first end 92 adjacent the valve seat 96.

In the illustrated embodiment, the valve seat 96 includes a circumferential ridge 96A surrounding the opening 98. The illustrated ridge 96A has a substantially rounded or toroidal surface contour such that the ball 88 sealingly engages the ridge 96A when the dump valve 32 is in the closed position.

In the illustrated embodiment, the valve seat member 62 is formed as a single piece from non-ferromagnetic material in a deep drawing process. An example of suitable non-ferromagnetic material is stainless steel. It will be understood however, that stainless steel is not required, and that the valve seat member 62 may be formed from any other desired non-ferromagnetic material. In the illustrated embodiment, the valve seat member 62 is widened at a distance from the first end 92 to define the flange 100. The illustrated flange 100 includes a crease defined between two substantially transversely extending wall portions 110 and 112. The wall portions 110 and 112 bear against one another substantially without any space between them.

The body 90 may be press-fit within the cylindrical portion 72 of the sleeve opening 70, such that the body 90 engages the lower cylindrical portion 72 of the sleeve 51.

The coil assembly 64 is disposed about the sleeve 51, armature 56, and magnetic core 82 and selectively induces a magnetic flux in the armature 56.

A circumferentially extending internal band filter 104 may be placed about the body 90 of the valve seat member 62, although such a band filter 104 is not required. The inner surface of the filter 104 seals against the outer surface of the body 90 of the valve seat member 62. A return flow path is defined between the outer surface of the filter 104 and the wall of the bore 19 and between the outer surface of the body 90 of the valve seat member 62 and the wall of the bore 19.

The bore 19 includes a lip seal groove portion 3. As shown in FIG. 2, the lip seal groove portion 3 is formed in a frusto-conical manner, as best described in WIPO Publication No. WO/2008/097534, the description of the lip seal and lip seal groove disclosed therein are incorporated herein by reference.

A lip seal 106 is disposed about the body 90 at the second end 94 of the valve seat member 62. The illustrated lip seal 106 is substantially V-shaped in transverse section, and includes a resilient annular body 106A. A resilient annular seal lip 106B includes an outer circumferential surface and flares radially outwardly and upwardly from the body 106A in the general direction of the valve seat member 62.

During assembly of the illustrated embodiment of the dump valve 32 into the housing 2, the sleeve 51 is disposed within the bore 19 of the housing 2 such that the flange 78 is supported on a shoulder portion 23 of the bore 19.

In the illustrated embodiment, the flange 78 of the collar 76, and therefore the dump valve 32 to which the collar 76 is attached, is retained and sealed within the bore 19 by clinching, wherein material of the housing 2 is forced into engagement with a first surface (an upwardly facing surface when viewing FIG. 2) of the flange 78. The collar 76 of the may also be retained in the bore 19 by any desired mechanical means operative to retain the dump valve 32 within the bore 19.

Figure 3:
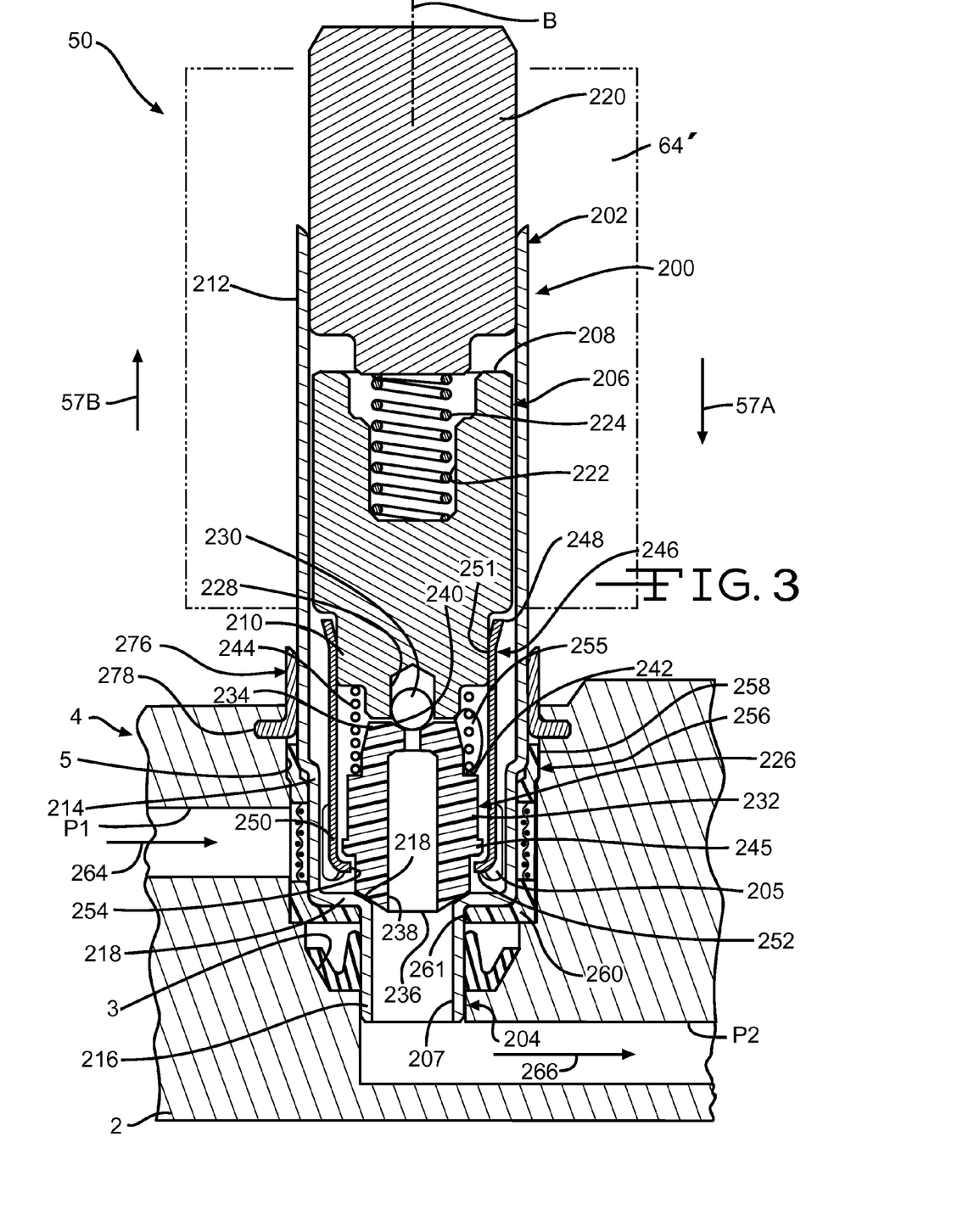
FIG. 3 is an enlarged sectional view of the normally closed supply valve illustrated in FIG. 1.
Figure 4:
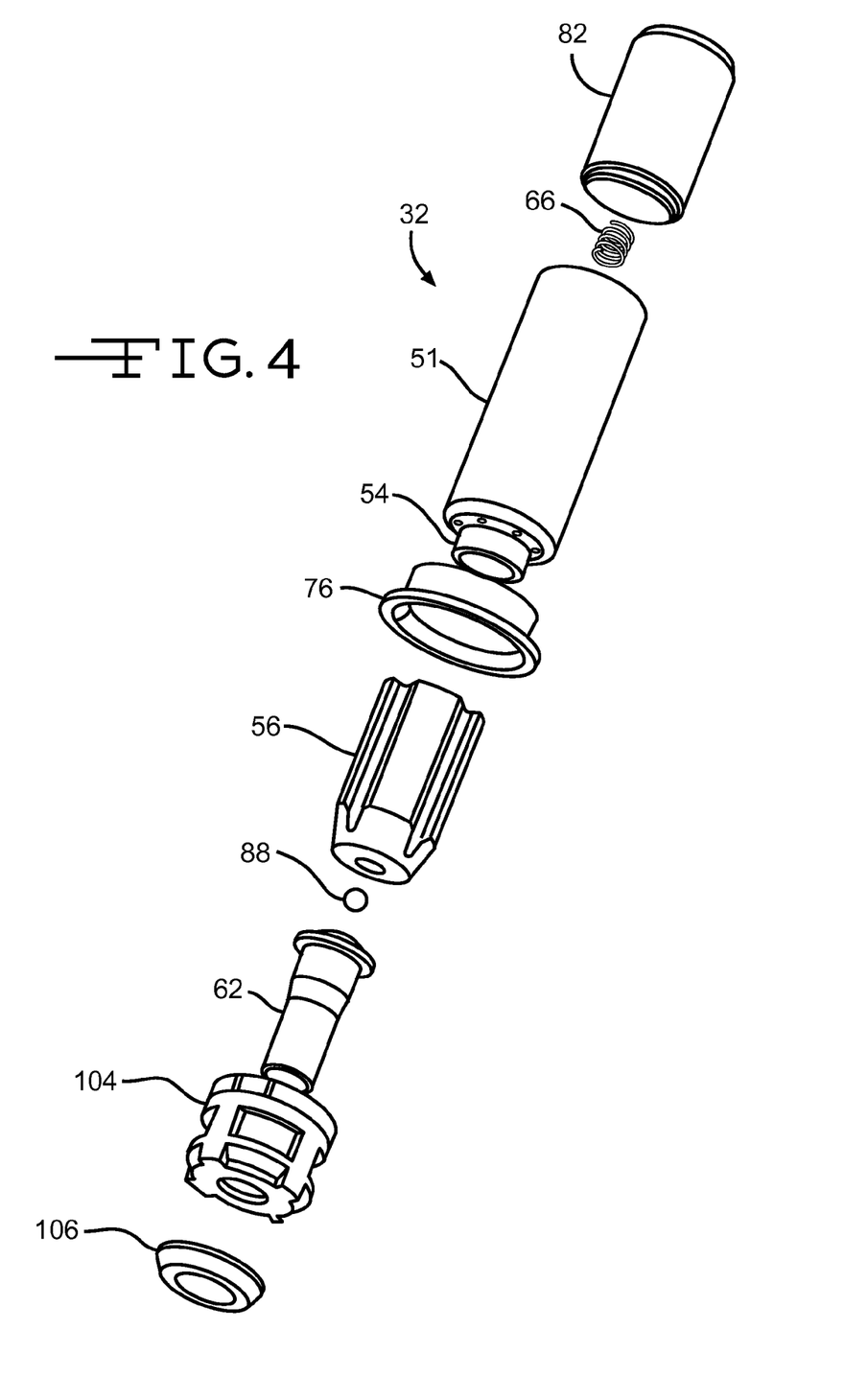
FIG. 4 is an exploded perspective view of the dump valve illustrated in FIG. 2.

A sectional view of an exemplary embodiment of the supply valve is indicated generally at 50 in FIG. 3. The supply valve 50 is received in a bore 5 formed in the housing 2 and controls fluid flow between a first passageway P1 and a second passageway P2. The supply valve 50 includes a valve body or sleeve 200 having a first end 202 (upper end when viewing FIG. 3) and a second end 204 (lower end when viewing FIG. 3) and defining a central axis B. An armature 206 has a first or upper end 208 and a second or lower end 210 and is slidably received in the sleeve 200. The supply valve 50 further includes a coil assembly (not shown) disposed about the sleeve 200.

In the illustrated embodiment, the sleeve 200 has a central opening 201 therethrough and is formed as a single piece from non-ferromagnetic material in a deep drawing process. An example of suitable non-ferromagnetic material is stainless steel. It will be understood however, that stainless steel is not required, and that the sleeve 200 may be formed from any other desired non-ferromagnetic material.

The sleeve 200 includes a first or upper body portion 212 having a first diameter, a second or intermediate body portion 214 having a second diameter, and a third or lower body portion 216 having a third diameter. The second end 204 of the sleeve 200 includes a radially inwardly extending first shoulder 218 extending between the second body portion 214 and the third body portion 216, and defining a valve seat 218. The second end 204 further defines a lower cylindrical opening 207. A plurality of fluid passages 205 are formed in the sleeve 200. A core 220 is attached to the first end of the sleeve 200, thereby closing the first end 202 of the sleeve 200. In the illustrated embodiment, the core 220 is pressed into the sleeve 200 with an interference fit. The core 220 may be further hydraulically sealed to the first end 202 of the sleeve 200 by any suitable means, such as with a single laser weld. Alternatively, the core 220 may be sealed to the first end 202 of the sleeve 200 by any other desired method. In the illustrated embodiment, the core 220 is formed from ferromagnetic material, such as low carbon steel.

The armature 206 is slidably received in the sleeve 200. In the exemplary embodiment illustrated, the first end 208 of the armature 206 includes a spring cavity 222. The first spring 224 is disposed in the cavity 222 and engages the armature 206 and the core 220 to urge the armature 206 and the poppet 226 (described in detail below) toward the valve seat 218 (in the direction of the arrow 57A) when the supply valve 50 is in the closed position. When the coil assembly, represented by the phantom line 64', is energized, the armature 206 and the poppet 226 are disposed at an extreme of travel away from the valve seat 218, such that the supply valve 50 is in an open position (not shown).

A recess 228 is formed in an end surface of the second end 210 of the armature 206. A closing element or ball 230 is pressed into the recess 228. In the illustrated embodiment, the ball 230 is formed from steel. Alternatively, the ball 230 may be formed from any other substantially non-deformable metal or non-metal. In the illustrated embodiment, the armature 206 is formed from ferromagnetic material in a cold forming process. An example of suitable ferromagnetic material is low-carbon steel. It will be understood however, that low-carbon steel is not required, and that the armature 206 may be formed from any other desired ferromagnetic material.

The poppet 226 is disposed between the armature 206 and the valve seat 218 and includes a generally cylindrical body 232 having a first end 234 (upper end when viewing FIG. 3), a second end 236 (lower end when viewing FIG. 3), and a bore 238 therethrough. The first end 234 defines a seat portion 240. A radially outwardly extending circumferential shoulder 242 is defined in an outer surface of the poppet 226 intermediate the first end 234 and the second end 236. A second spring 244 extends between the second end 210 of the armature 206 and the shoulder 242. A radially outwardly extending circumferential flange 245 is also formed in an outer surface of the poppet 226.

In the illustrated embodiment, the poppet 226 is formed as a single piece from plastic material. An example of suitable plastic material is polyether ether ketone (PEEK). Alternatively, the poppet 226 may be formed from nylon, such as nylon 136. It will be understood that the poppet 226 may also be formed from any other desired material.

A substantially cup-shaped cage 246 includes a first end 248 (upper end when viewing FIG. 3), a second end 250 (lower end when viewing FIG. 3), and a central opening 251 formed therethrough. The second end 250 of the cage 246 includes a radially inwardly extending shoulder 252 defining a cage opening 254. A plurality of fluid passages 255 are formed in the cage 246. In the illustrated embodiment, the cage 246 is formed as a single piece in a deep drawing process. An example of suitable material is low-carbon steel. It will be understood however, that low-carbon steel is not required, and that the cage 246 may be formed from any other desired ferromagnetic or non-ferromagnetic material.

The flange 245 of the poppet 226 is slidably received within the cage 246. The second end 236 of the poppet 226 extends through the opening 254 of the cage 246 and further sealingly engages the valve seat 218.

A substantially cylindrical mounting collar 276 is attached, such as by welding, about an outer surface of the second end 204 of the sleeve 200. The illustrated collar 276 includes a radially outwardly extending circumferential flange 278 at one end (the lower end when viewing FIG. 3).

An electrical coil (shown schematically at 64') is disposed about the sleeve 200, armature 206, and core 220 and selectively induces a magnetic flux. The magnetic flux induced by the coil will run through the core 220, the armature 206, and through the cage 246 when the cage 246 is formed from ferromagnetic material. Because the supply valve 50 is a normally closed valve, the first spring 224 urges the armature 206 and the poppet 226 into contact with the valve seat 218 when the coil assembly of the supply valve 50 is not energized, thereby blocking fluid flow through the supply valve 50. When the coil assembly is energized, the armature 206 and the poppet are urged away from the valve seat 218 to permit fluid flow through the supply valve 50.

A circumferentially extending internal band filter 256 includes a first end 258 and a second end 260 and may be placed about the second body portion 214 of the sleeve 200. In the illustrated embodiment, the second end 260 includes an opening 261 through which the third body portion 216 extends. The second end 260 of the filter 256 further engages the first shoulder 218. It will be understood however, that such a band filter 256 is not required. A lip seal 262 is disposed about the third body portion 216 of the poppet 226 between the filter 256 and the second end 236 of the poppet 226.

The ball 230 acts as a valve sealing element and engages the seat portion 240 of the poppet 226 when the valve 50 is in the closed position (e.g. when the coil assembly 134 is not energized).

If a pressure difference between the inlet side (see the arrow 264) and the outlet side (see the arrow 266) of the housing 2 is relatively small, and if the closing force acting on the poppet 226 is lower than the force exerted by the second spring 244, then the valve seat 218 is opened without movement of the poppet 226 relative to the armature 206.

When the pressure difference between the inlet side 196 and the outlet side 266 of the housing 2 is relatively large, then the hydraulic closing force acting on the poppet 226 may be greater than the sum of the magnetic force exerted on the armature 206 and the force of the second spring 244 as it attempts to pull the poppet 226 off of the sleeve 200.

The magnetic force, which is low at the beginning of the armature 206 stroke (upward as viewed in FIG. 3), will, upon movement of the armature 206 toward the core 220, overcome the pre-stressing force of the first spring 224 and the hydraulic closing force acting on the armature 206, in order to open the poppet 226 (by moving the ball 230 of the armature 206 away from the seat portion 240 of the poppet 226).

Opening the seat portion 240 of the poppet 226 over the course of armature 206 movement, fluid may flow through the bore 238 of the poppet 226 to the outlet side 266. As a result of the opening of the seat portion 240, the pressure difference is reduced, at which point the poppet to sleeve seal (at the valve seat 218) is opened for increased fluid flow, specifically second stage flow, relative to flow rates only through the seat portion 240 of the poppet 226.

The principle and mode of operation of the control valve have been described in its various embodiments. However, it should be noted that the control valves described herein may be practiced otherwise than as specifically illustrated and described without departing from its scope.

What is claimed is:

1. An electromagnetic valve for use in controlling fluid flow between first and second passageways in a hydraulic valve block, comprising:

a valve body defining a central axis and having a central opening therethrough, the valve body having a lower end adapted to be inserted into a bore of the valve block and provided with a lower cylindrical opening;

an armature axially moveable within the valve body;

a spring for biasing the armature in one axial direction;

a closing element carried by a lower end of the armature;

an electromagnetic coil coaxially surrounding the armature and operable to effect axial movement of the armature in an axial direction opposite the one direction; and a valve seat member carried by the lower end of the valve body and having an orifice providing fluid flow between the first and second valve block passageways, the valve seat member defining a valve seat surrounding the orifice and cooperating with the closing element for selectively closing the orifice, and wherein the valve seat member includes a cylindrical tubular portion positioned within the lower cylindrical opening of the valve body, characterized in that:

the lower cylindrical opening of the valve body is provided with a stop surface at the upper end of thereof, the valve seat is defined at an outside upper end of the valve seat member, the cylindrical tubular portion extends outwardly and downwardly from the valve seat and is sealingly engaged with the lower cylindrical opening of the valve body, and an upper part of the cylindrical tubular portion of the valve seat member includes a radially outwardly extending flange between the valve seat and the portion of the cylindrical tubular portion that is sealingly engaged with the lower cylindrical opening of the valve body, the flange engageable with the stop surface for limiting downward movement of the valve seat member relative to the valve body.

2. The electromagnetic valve according to claim 1, wherein the valve body is a one piece deep drawn part.

3. The electromagnetic valve according to claim 1, wherein a lower part of the cylindrical portion of the valve seat member projects downwardly below a lowermost end of the valve body and carries a seal engageable with the bore of the valve block.

4. The electromagnetic valve according to claim 1, wherein the valve seat of the valve seat member includes a circumferential ridge surrounding the orifice, wherein the circumferential ridge has a substantially toroidal surface contour.

5. The electromagnetic valve according to claim 1, wherein the valve seat member is a one piece deep drawn part.

6. The electromagnetic valve according to claim 1, wherein the valve body includes a lower cylindrical portion defining the lower cylindrical opening for receiving the valve seat member, and an upper cylindrical portion section for receiving the armature, the upper cylindrical portion defining an inner diameter greater than an inner diameter of the lower cylindrical opening, and wherein the lower and upper cylindrical portions are connected by a radial wall which defines the stop surface.

7. The electromagnetic valve according to claim 1, wherein the flange includes a crease defined between two substantially transversely extending wall portions, the wall portions bearing against one another substantially without any space therebetween.

8. An electromagnetic valve for use in controlling fluid flow between first and second passageways in a hydraulic valve block, comprising:

a one-piece valve body defining a central axis and having a central opening therethrough, the central opening having a first diameter, the valve body having a lower end adapted to be inserted into a bore of the valve block and provided with a lower cylindrical opening, the lower end of the valve body including a radially inwardly extending shoulder defining a valve seat and a cylindrical tubular portion extending outwardly and downwardly from the valve seat, the cylindrical tubular portion having a second diameter smaller than the first diameter;

an armature axially moveable within the valve body and spring biased in one axial direction;

a closing element carried by a lower end of the armature;

an electromagnetic coil coaxially surrounding the armature and operable to effect axial movement of the armature in an axial direction opposite the one direction;

a cage having a central opening therethrough, the cage having an upper end attached to the lower end of the armature and a lower end; and a poppet having a bore therethrough, the poppet disposed within the central opening of the cage and spring biased away from the lower end of the armature;

the lower end of the cage having a radially inwardly extending cage shoulder defining a cage opening;

a lower end of the poppet is engageable with the valve seat; and a seal carried by the lower end of the valve body, the seal engageable with the bore of the valve block.

9. The electromagnetic valve according to claim 8, wherein a fluid passage is formed through a lower end of the valve body.

10. The electromagnetic valve according to claim 9, wherein the valve body is a one piece deep drawn part.

11. The electromagnetic valve according to claim 8, further including a band filter disposed between the lower end of the valve body and the bore.

12. The electromagnetic valve according to claim 8, wherein the poppet includes a first end defining a seat portion, and a second end.

13. The electromagnetic valve according to claim 12, wherein the poppet includes a radially outwardly extending circumferential flange intermediate the first end and the second end, wherein the flange of the poppet is slidably received within the cage, and wherein the second end of the poppet extends through a cage opening and sealingly engages the valve seat.

14. The electromagnetic valve according to claim 8, wherein a fluid passage is formed through the cage.

* * * * *